(12) United States Patent
McRae

(10) Patent No.: US 9,871,838 B2
(45) Date of Patent: Jan. 16, 2018

(54) MEDIA PLAYBACK REDIRECTED TO A NETWORKED RENDERER

(71) Applicant: Vizio Inc, Irvine, CA (US)

(72) Inventor: Matthew Blake McRae, Irvine, CA (US)

(73) Assignee: Vizio, Inc, Irvine, CA (US)

( * ) Notice: Subject to any disclaimer, the term of this patent is extended or adjusted under 35 U.S.C. 154(b) by 159 days.

(21) Appl. No.: 14/574,627

(22) Filed: Dec. 18, 2014

(65) Prior Publication Data

US 2016/0182585 A1    Jun. 23, 2016

(51) Int. Cl.

| | |
|---|---|
| H04N 7/173 | (2011.01) |
| H04N 21/274 | (2011.01) |
| H04N 21/61 | (2011.01) |
| H04L 29/06 | (2006.01) |
| H04N 21/858 | (2011.01) |
| H04N 21/239 | (2011.01) |
| H04N 21/472 | (2011.01) |
| H04N 21/426 | (2011.01) |
| H04N 21/475 | (2011.01) |
| H04N 21/658 | (2011.01) |

(52) U.S. Cl.
CPC ...... *H04L 65/4076* (2013.01); *H04L 65/4084* (2013.01); *H04N 21/2393* (2013.01); *H04N 21/42684* (2013.01); *H04N 21/4755* (2013.01); *H04N 21/47202* (2013.01); *H04N 21/6125* (2013.01); *H04N 21/6175* (2013.01); *H04N 21/6581* (2013.01)

(58) Field of Classification Search
CPC ......... H04N 21/42684; H04N 21/4755; H04N 21/6581; H04N 21/6175; H04N 21/47202; H04N 21/2393; H04N 21/6125; H04L 65/4076; H04L 65/4084
See application file for complete search history.

(56) References Cited

U.S. PATENT DOCUMENTS

| | | | |
|---|---|---|---|
| 2010/0169778 A1* | 7/2010 | Mundy ............. | G06F 17/30905 715/716 |
| 2012/0227076 A1* | 9/2012 | McCoy ............. | H04N 21/2387 725/110 |
| 2014/0173078 A1* | 6/2014 | McCord .................. | H04L 45/44 709/223 |
| 2015/0086033 A1* | 3/2015 | Tebbs ..................... | H04L 65/60 381/77 |

(Continued)

*Primary Examiner* — Dustin Nguyen
*Assistant Examiner* — Juan C Turriate Gastulo
(74) *Attorney, Agent, or Firm* — Law Office of Scott C Harris, Inc

(57) ABSTRACT

A single stream receiver is preselected from a global list residing on a client computing device hosting a content casting application. Once a user launches a content casting application and selects a content stream from local or networked storage, the content casting application accesses the global list to obtain the ID of the stream receiver to receive the content stream. The global list has at least one preselected stream receiver ID that will receive a casted content stream without the user having to manually select a stream receiver for each stream that is casted. The preselected stream receiver can be the last one that was used, or can be the last one that was used for a specified user, or the last one that was used for a specified application. The stream receiver can be preselected in some other way.

14 Claims, 7 Drawing Sheets

(56) References Cited

U.S. PATENT DOCUMENTS

2016/0094648 A1* 3/2016 Han .................... H04L 67/1051
709/209
2016/0173937 A1* 6/2016 Shih ................. H04N 21/43615
725/37

* cited by examiner

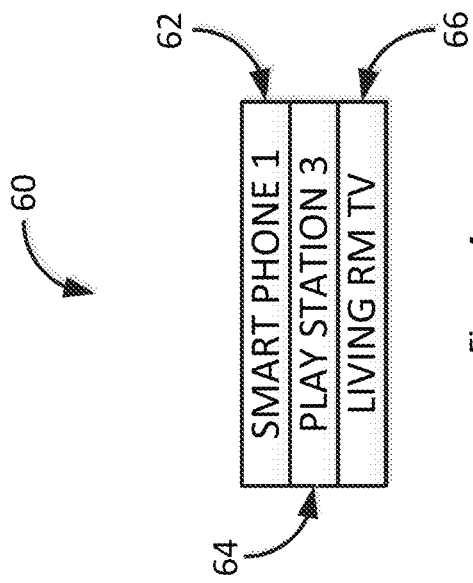

MEDIA PLAYBACK REDIRECTED TO A NETWORKED RENDERER

BACKGROUND

The introduction of "casting" applications such as Google's Chromecast enabled applications that select content streams and stream receivers now make it possible to select multimedia content hosted on intranets and the internet and to direct the content stream to any display device that hosts a stream receiver or has a stream receiving device such as Google Chromecast attached to the display device.

Casting applications facilitate the selection of content by the user being able to use a laptop computer, desktop computer, tablet computer, PDA, or cell phone to select multimedia content on cloud based service providers such as Netflix, Amazon, Hulu, Pandora, or other such services. Once a user selects a casting application for accessing content, the user can select streaming content and then redirect the content stream by selecting a stream receiver to play the content stream. The user presses the play button and the casting application will "cast" the stream to the selected stream receiver.

A typical household environment or a business environment may contain multiple stream receivers and multiple casting or redirect applications. An environment with both multiple casting/redirect applications and multiple stream receivers can quickly become confusing as to which casting/redirect application will make use of which stream receiver.

SUMMARY

The inventor recognized a need to associate content casting applications that connect to streaming content providers to be associated with user selected stream receivers such that selection of an application would automatically redirect the program content stream to the previously selected stream receiver.

The present application defines preselecting at least a single stream receiver from a global list residing on a client computing device hosting a content casting application. A client computing device hosts a global list of stream receivers, at least one stream receiver connected to or residing inside of a display device, a stream receiver application residing in the at least one stream receiver, and a content casting application residing in the client computing device. Once a user launches a content casting application and selects a content stream from local or networked storage, the content casting application accesses the global list to obtain the ID of the stream receiver to receive the content stream. The global list contains at least one preselected stream receiver ID that receives the casted content stream without the user having to manually select a stream receiver for each stream that is casted.

Embodiments describe an association list that links a casting application to a preselected stream receiver. The association list may include multiple stream receivers.

BRIEF DESCRIPTION OF THE DRAWINGS in the drawings:

FIG. 3 is a depiction of a single item list contained within a stream casting application identifying a user selected stream receiver.

FIG. 4 is a depiction of a global ordered list of stream receivers for use by a casting application. The casting application will automatically cast a stream to the first available stream receiver.

DETAILED DESCRIPTION

Embodiments

In a preferred embodiment, a casting application includes an identifying indication, or "ID" of a user selected stream receiver. In this embodiment, the user launches a casting application and selects a streaming content file. The casting application then automatically casts the URL to a preselected stream receiver. This eliminates the need for the user to first select a content selection application, select a program, and then select a stream receiver. This embodiment does not check if the stream receiver is currently busy; and instead will cast a stream to a currently busy stream receiver which will abort the current stream and start the new stream.

In another embodiment, the stream casting application will first check the status of the selected stream receiver before casting the stream. If the receiver is busy, the stream casting application will not cast the selected stream or will ask for information about a receiver to receive the stream.

In another preferred embodiment, the casting application has a global ordered list of IDs of user selected stream receivers. In this embodiment, the content casting application casts the URL to the preselected stream receiver; and if the stream receiver is busy or not ready, it will refuse the casted stream by notifying the casting application. In this event, the casting application will cast the URL to the next stream receiver in the list. This loop will continue until one of the stream receivers in the list accepts the casted URL or the list is exhausted in which case, the casting application notifies the user.

In another preferred embodiment, the global list associates specific content providers such as Netflix with a specific stream receiver. For example, live presentations of sporting events from ESPN® will always be cast to a stream receiver in the den while movie presentations from Netflix® will always be cast to a stream receiver in the living room.

Figure 1:
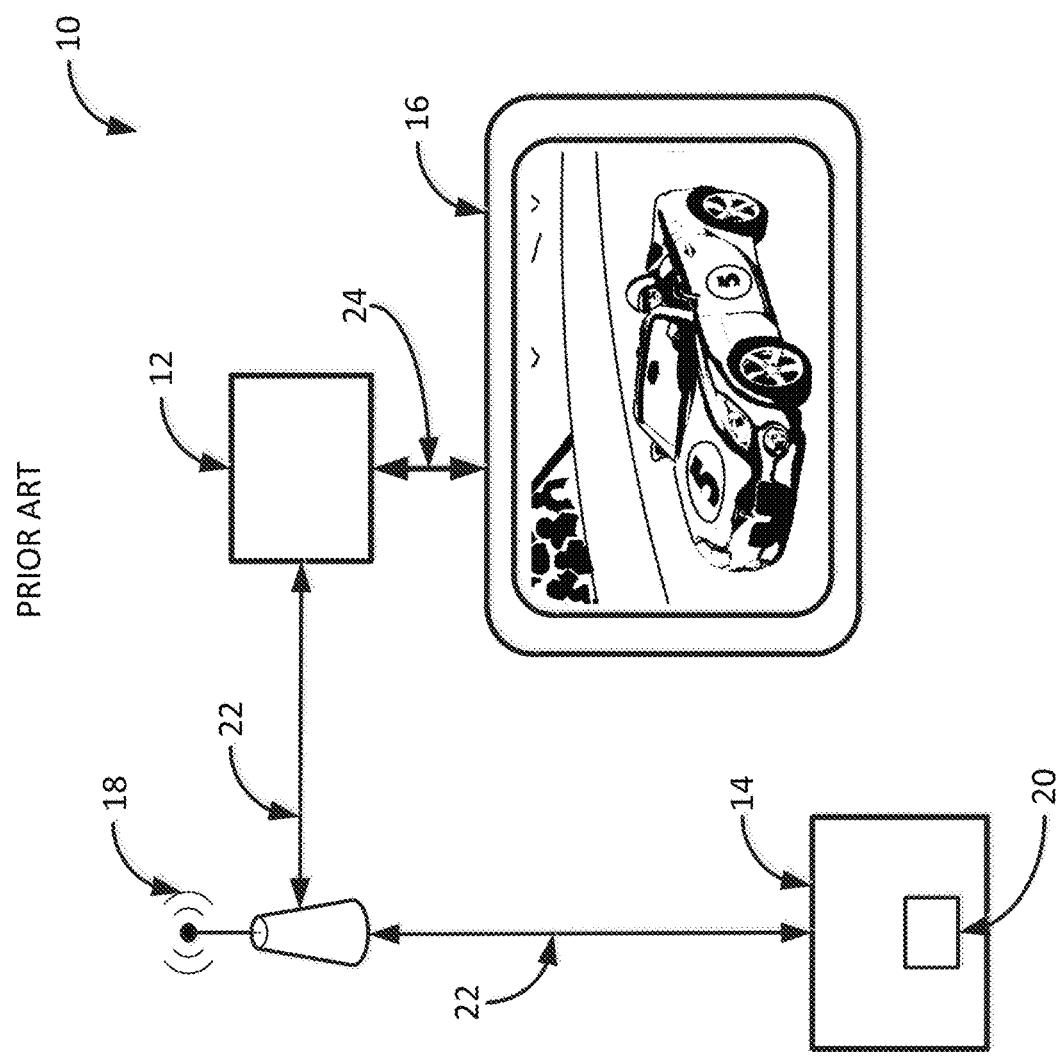
FIG. 1 is a prior art schematic depiction of the devices in a stream casting environment.

Now referencing prior art FIG. 1 where 10 is a depiction of a stream casting application 20 that resides and executes on tablet computer 14. This figure depicts the interaction between stream casting application 20 and stream receiver 12 that renders streams on television 16. Stream casting application could alternatively execute on a desktop or laptop computer, Smart Phone, or a PDA.

In the present embodiment, stream casting application 20 accesses a web site such as Netflix® and displays a catalog of program content files. Stream casting application 20 accesses the web site of a single content provider through tablet computer 14 having access to the internet through communications link 22 and Wifi access point 18. Wifi access point 18 also has a communications link 22 to stream receiver 12. Tablet computer 14 and stream casting application 20 communicate with stream receiver 12 via communications links 22 and Wifi access point 18.

In this prior art depiction, the user launches stream casting application 20 residing on tablet computer 14. Stream casting application accesses, for example, the Netflix web site, and displays a catalog of program content. The user selects one of the programs and then presses "PLAY ON" button 38 shown in FIG. 2. The user then selects a stream receiver from a list of stream receivers (40, 42, and 44 shown in FIG. 2) shown on the user interface of stream casting application. Once the user selects the stream receiver 12, for example, stream casting application 20 sends the necessary information relating to the selected stream to stream receiver 12. Stream receiver 12 operates, after receiving the stream information, to contact the program content provider and start receiving the stream via communications link 22 and Wifi access point 18. As the stream is received by stream receiver 12, the stream is decoded and rendered on television 16.

Figure 2:
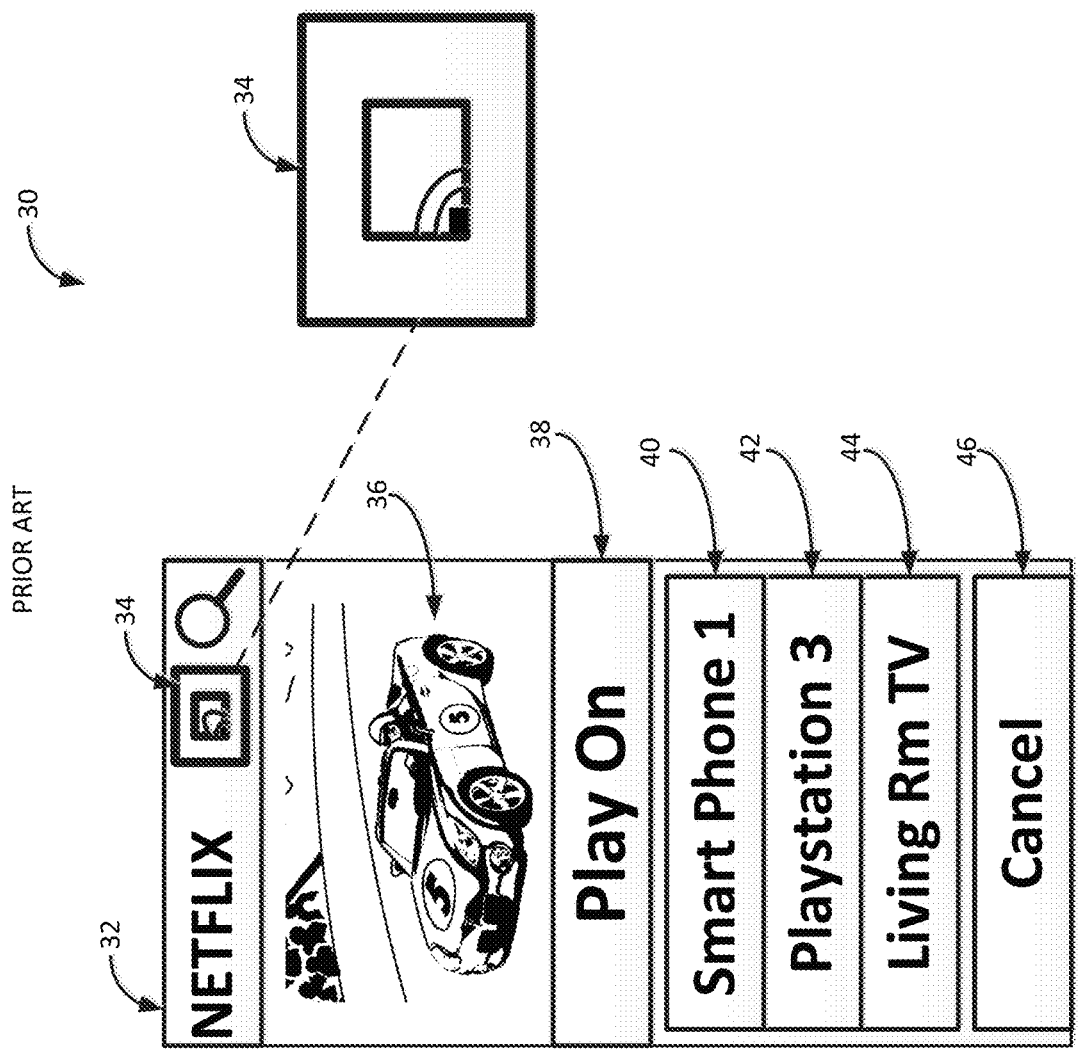
FIG. 2 is a prior art depiction of a stream casting application for NetFlix™ showing that the user has selected a content file and that the application has detected 3 stream receivers, any of which can be selected for receiving the selected content stream.

Prior art FIG. 2 shows a line art rendering of stream casting application 20 as used by Netflix®. Note that casting icon 34 is present on any stream casting application and identifies the application as stream casting capable.

In this depiction, display window 36 depicts a frame of the video stream or a poster of the program content that will be cast to stream receiver 12 of FIG. 1. Buttons 40, 42, and 44 depict the names of three stream cast receivers detected via Wifi access point 18 FIG. 1. In this prior art depiction, the user launches stream casting application 18 of FIG. 1 which accesses the Netflix® web site and gathers a portion of the Netflix® catalog and displays that portion on display window 36. Once a content file is selected, a frame of the video stream or a program poster is rendered in window 36. The user next presses "Play On" button 38 and then presses one of the stream receiver buttons (40, 42, 44) selecting the stream receiver that will receive the necessary information allowing it to initiate and receive the content stream. Stream receiver 12 then receives and decodes the video stream and renders the stream on television 16.

Now referencing FIG. 3 where 50 depicts an embodiment of the invention where the user preselects a single stream receiver from global list 50. In this embodiment, stream casting application 20 operates, after the user has selected a program content stream, to automatically send the stream info to, in this example, Play Station 3 depicted as entry 42 in FIG. 2.

Embodiments described herein relieve the user of having to select a stream receiver each time from a possible plurality of stream receivers. Note also that the system shown in FIG. 2 presupposes that the stream receivers have user-friendly names, such as smart phone 1 and living room TV. However, this requires that the user have set up this stream receiver to have that name. Very often, the stream receiver will have an unidentifiable name such as "chromecast A04" or other such name. The user can of course rename these devices, but does not always do so, rather, the user may guess which stream receiver is which, and then go check on it. After the user has gone through all the trouble to figure out which stream receiver is which, these embodiments provide even further advantages.

Now referencing FIG. 4 where global list 60 is a global ordered list containing the names of a plurality of stream receivers ordered by preference. In this embodiment, stream casting application 20 will, after the user has selected a program content stream, automatically search global ordered list 60. Stream casting application begins by requesting status from the first entry in global ordered list 60. Stream casting application 20 automatically sends the stream info to the first stream receiver that returns a status of READY. This embodiment not only relieves the user of having to select a stream receiver from a possible plurality of stream receivers, it will send the stream to the first stream receiver that is not busy and the people watching content on one of the busy stream receivers have no worry that the content they are watching will be interrupted.

Figure 5:
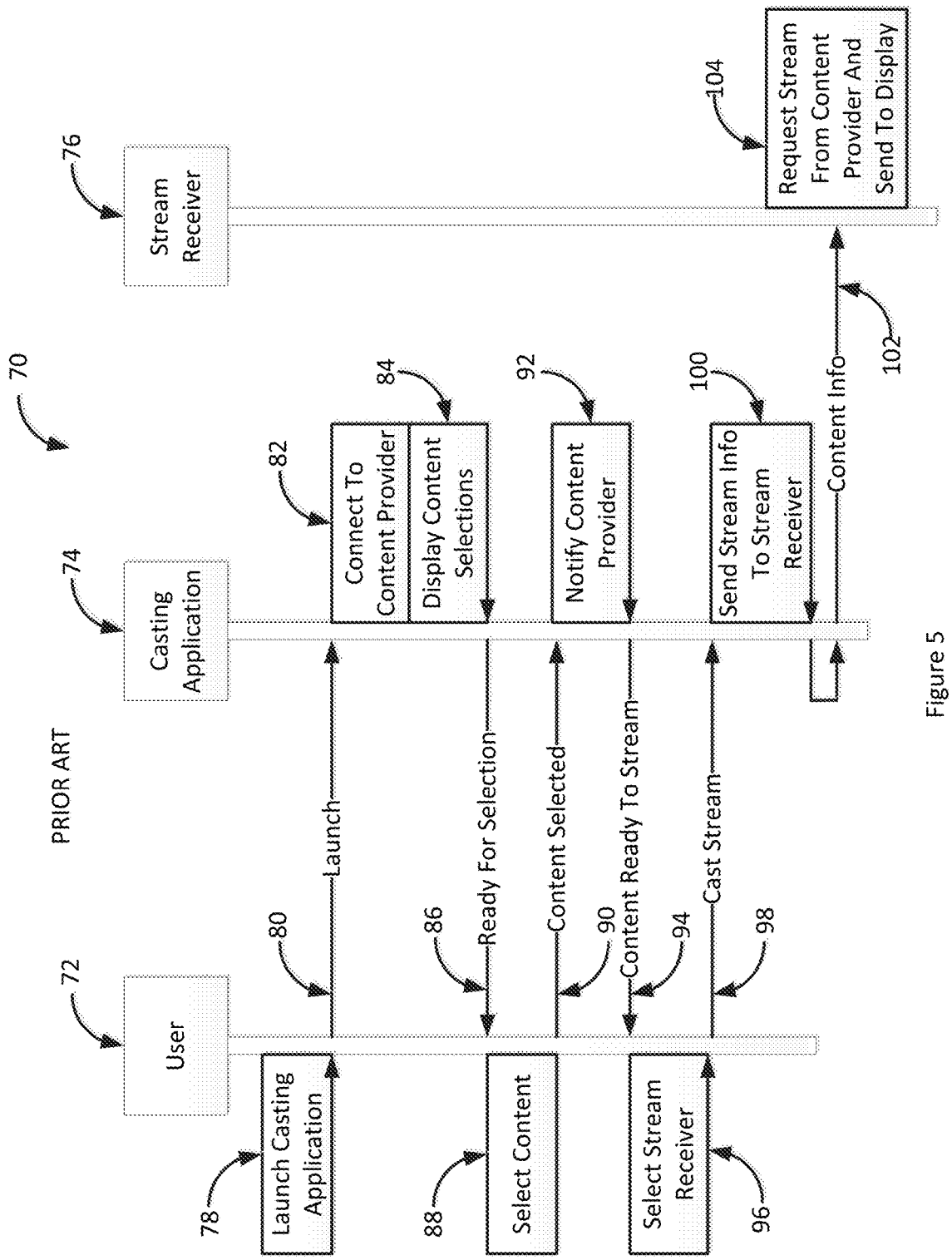
FIG. 5 is a schematic showing the logic flow of a prior art casting application such as the one used by Netflix™.

Now referencing prior art FIG. 5 where 70 depicts the logic flow of a standard stream casting application. Depicted in this figure is user 72, casting application 74, and the stream receiver 76. The process begins with user 72 at logic block 78 launch casting application. The user's actions result in casting application 74 launching and starting at logic block 82 connect to content provider. This logic block connects via a network to the content provider's web site. Once the connection is made, control falls through to logic block 84 to display content selections. This logic block accesses a portion of the content catalog from the content provider and displays it in display window 36 FIG. 2 and sends notification 86 ready for selection to user 72. At this point, user 72 selects content 88 and sends the content selected 90 to casting application 74 at Logic block 92 notify content provider. This logic block sends information to the content provider that a selected program content is to be streamed. Logic block 92 notify content provider sends content ready to stream 94 to user 72 at logic block 96 select stream receiver. At this point, user 72 at logic block 96 selects stream receiver, presses the "Play On" button 38 FIG. 2. Stream casting application 74 displays a list of all stream receivers detected on local Wifi access point 18 FIG. 1. Once user 72 selects a stream receiver, casting application 74 is notified by signal cast stream 98 being received by casting application 74 at logic block 100 send stream info to stream receiver. This logic block sends signal content info 102 to stream receiver 76 at logic block 104 request stream from content provider and send to display 16 FIG. 1. This logic notifies the content provider's web site to start the stream whose info was sent to the web site at logic block 92 notify content provider. As the stream is received at logic block 104 of stream receiver 76 will decode and render the stream on display 16 FIG. 1.

Figure 6:
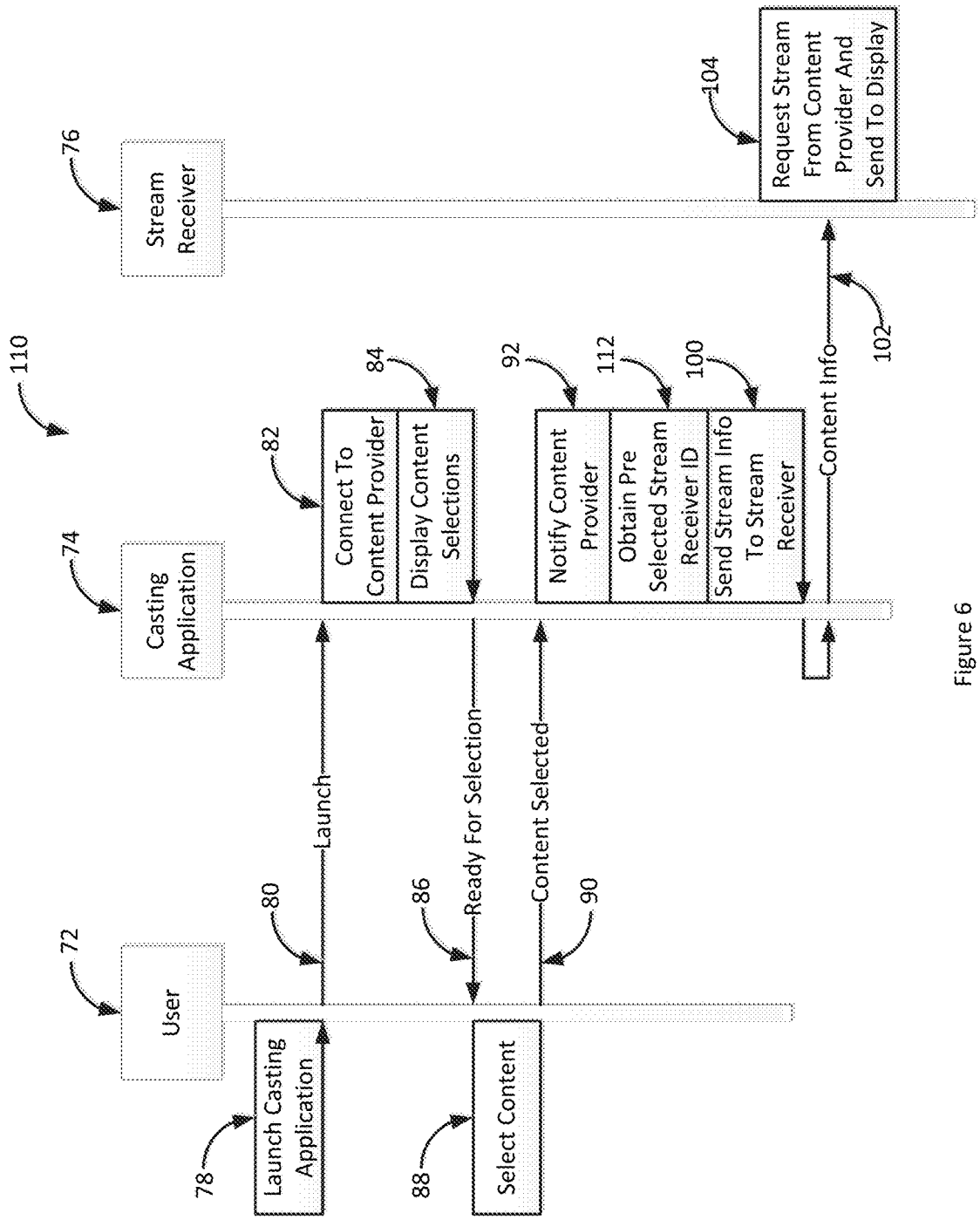
FIG. 6 is a schematic showing the logic flow of a casting application where the name of a single stream receiver has been pre-entered by the user into the casting application.

Now referencing FIG. 6 which is a schematic depiction of the logic flow of one embodiment of the invention. Depicted in this figure is the user 72, casting application 74, and the stream receiver 76. The process begins with user 72 at logic block 78 launching casting application. The user's actions results in casting application 74 launching and starting at logic block 82 connect to content provider. This logic block connects via a network to the content provider's web site. Once the connection is made, control falls through to logic block 84 to display content selections. This logic block accesses a portion of the content catalog from the content provider and displays it in display panel 36 FIG. 2 and sends notification 86 ready for selection to the user 72. At this point, user 72 selects content 88 and sends content selected 90 to casting application 74 at logic block 92 notify content provider. This logic block sends the necessary information to the content provider that a selected program content is to be streamed. At this point, control falls through to logic block 112 to obtain a pre-selected stream receiver ID. For this depiction, the user will have preselected any one of the stream receivers depicted as 40 Smart Phone 1, 42 Play Station 3, and Living RM TV 44 shown in FIG. 2. For this embodiment, assume that the user had previously selected 42 Play Station 3. When logic block 112 executes, it obtains the Id of the preselected stream receiver 42 Play Station 3 from global stream receiver list 50 in FIG. 3. Control then falls through to logic block 100 send stream info to stream receiver. Logic block 100 send stream info to stream receiver sends signal 102 content info to stream receiver 74 at logic block 104 to request a stream from content provider and send to display. This logic block notifies the content provider's web site to start the stream whose info was sent to the web site at logic block 92 notify content provider. As the stream is received, logic block 104 of stream receiver 76 will decode and render the start on display 16 FIG. 1.

This embodiment allows the user to segregate a given stream casting application to a predetermined stream receiver and display device.

Figure 8:
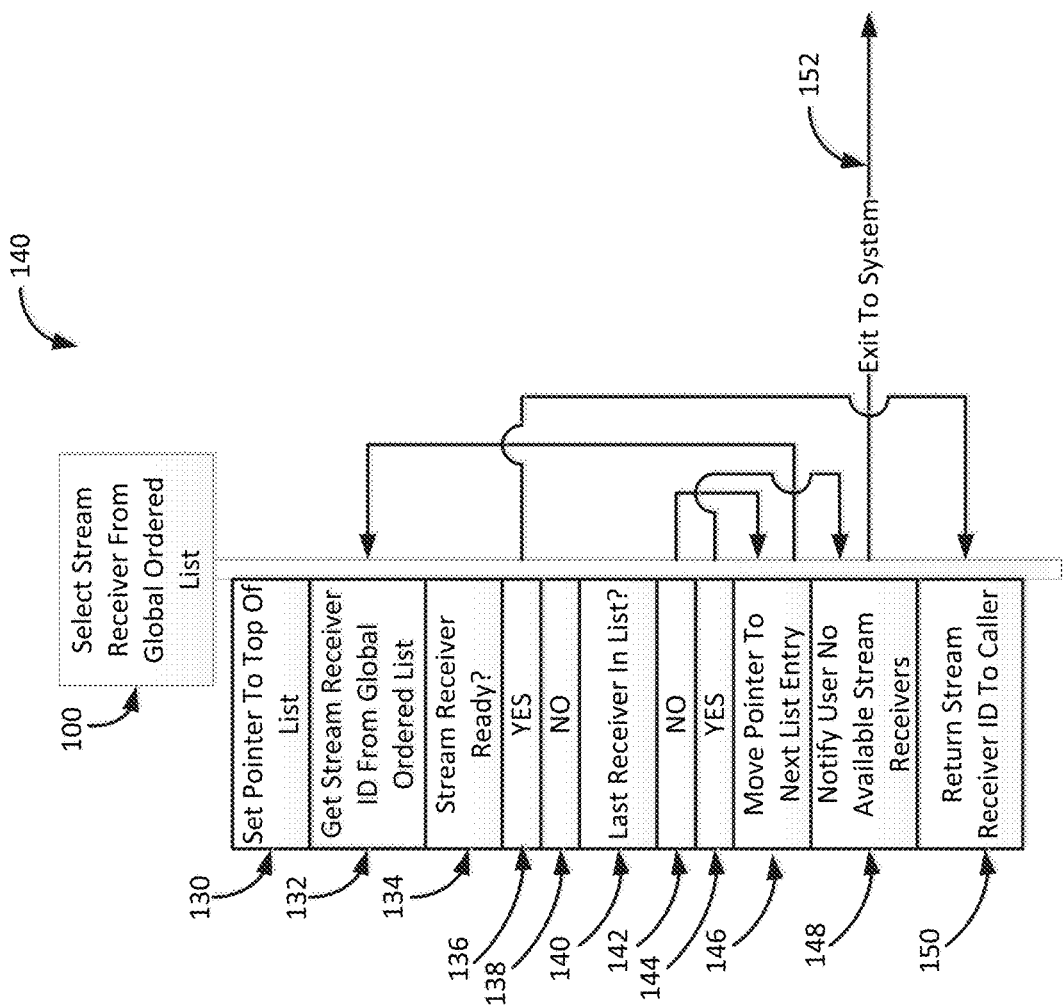
FIG. 8 is a schematic showing the logic flow of a common function called by the schematic shown for FIG. 7.

Now referencing FIG. 8 which is a schematic depiction of the logic flow of a callable function. In this figure, 140 depicts callable function "Select Stream Receiver From Global Ordered List". Entry to the function is through function block 100 select stream receiver from global ordered list. Execution of the function begins at logic block 130 set pointer to top of list. This logic block sets an index pointer to the first 40 entry of global ordered list 60 shown in FIG. 4. Control then falls through to logic block 132 get stream receiver ID from global ordered list. This logic block gets the stream receiver ID for entry 40 Smart Phone 1 FIG. 4 after which control falls through to decision logic block 134 stream receiver ready? This decision block requests the status of stream receiver 40 Smart Phone 1 via Wifi access point 18. If the returned status is "READY" then control will fall through to logic block 136 "YES" which directs control to logic block 150 return stream receiver ID to caller. This logic block returns to the caller with the current status of stream receiver 40 Smart Phone 1 as "READY". If decision logic block 134 received a return status of "NO", control would have fallen through to logic block 138 "NO" after which control would have fallen through to decision logic block 140 last receiver in list? This logic block determines if the current index pointer is positioned to the last entry in global ordered list 60. If the pointer is at the last entry 44 of global ordered list 60, control transfers to logic block 144 "YES". This logic block transfers control to logic block 148 notify user no available stream receivers after which control exits at 152 exit to system. If decision logic block 140 determines that index pointer was not at the last entry in global ordered list 60, control falls through to logic block 142 "NO" after which control is transferred to logic block 146 to move pointer to next list entry. This logic block increments the index pointer to the next entry in global ordered list 60 then transfers control to logic block 132 to get stream receiver ID from global ordered list. At this point control is at the top of a loop for checking for the first available stream receiver.

Figure 7:
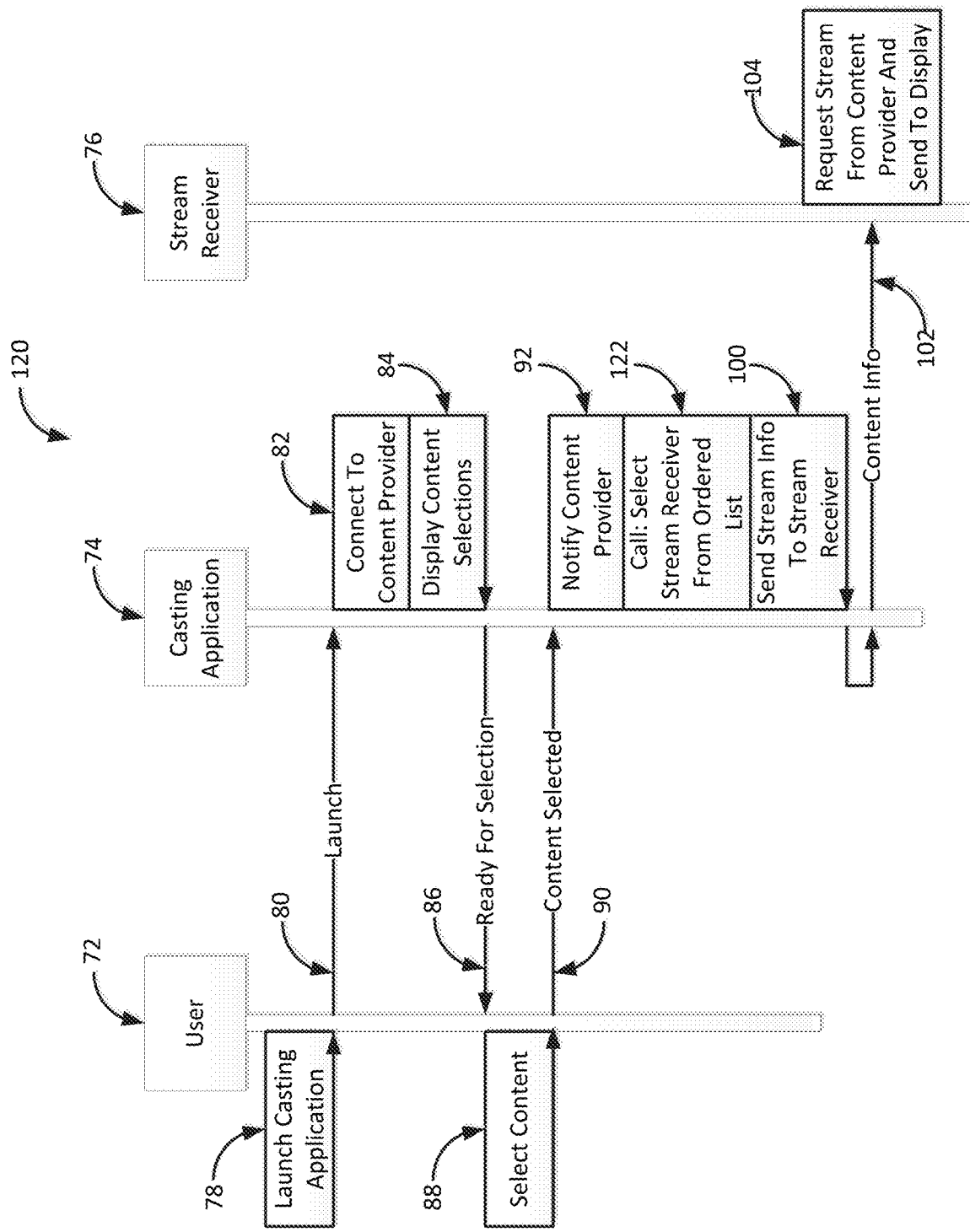
FIG. 7 is a schematic showing the logic flow of a casting application where the names of several stream receivers have been entered by the user into the casting application in order of preference.

Now referencing FIG. 7 which is a schematic depiction of the logic flow of one embodiment of the invention. Depicted in this figure is the user 72, casting application 74, and the stream receiver 76. The process begins with user 72 at logic block 78 launch casting application. The user's actions results in casting application 74 launching and starting at logic block 82 connect to content provider. This logic block connects via a network to the content provider's web site. Once the connection is made, control falls through to logic block 84 display content selections. This logic block accesses a portion of the content catalog from the content provider and displays it in display panel 36 FIG. 2 and sends notification 86 ready for selection to user 72. At this point, user 72 will select content 88 and sends content selected 90 to casting application 74 at logic block 92 notify content provider. This logic block sends the necessary information to the content provider that selected program content is to be streamed after which control will fall through to function call logic block 122. This logic block calls function 130 selects stream receiver from global ordered list which returns the ID of the first available stream receiver listed in global ordered list 60 FIG. 4. When control is returned from function 130, control will fall through to logic block 100 send stream info to stream receiver. Logic block 100 will send signal 102 content info to stream receiver 74 at logic block 104 request stream from content provider and send to display. This logic notifies the content provider's web site to start the stream whose info was sent to the web site at logic block 92 notify content provider. As the stream is received logic block 104 of stream receiver 76 will decode and render the start on display 16 FIG. 1. This embodiment allows the user to automatically have a selected control stream cast to the first available stream receiver whose ID is controlled in global ordered list 60.

Other embodiments are possible and are included within the disclosed invention. For example, as of the time of writing of this application, only some 14 specific apps support Chromecast. The cast button on the app sends the instance of the tab with the embedded video to the Chromecast dongle on the TV. The embodiments can be used to profile multiple users where the stream receiver for the same program would default to different displays depending on who is currently logged onto the client device. For example, when user "A" is logged on to the client device, the stream receiver associated with the last place that user "A" stream to will be automatically set as the default stream receiver. Alternatively, when user "B" is logged on to the client device, a different stream receiver, here stream receiver 2, is set as the default stream receiver, where stream receiver "B" is the last stream receiver that was used by user "B".

So for example, consider a household with multiple stream receivers. The parents may log on to Netflix or some other service, and want the stream to stream to the living room television. If the living room television is the last receiver that received that stream, then when the parents are logged on, that will be set as the next default. When child one logs on to the service, the user information associated with child one is set as the default for child one, for example streaming the information to the bedroom or rec room associated with child 1.

Another embodiment can operate with a mobile client device. In the mobile client device embodiment, the client detects the closest display device, and automatically defaults to the display device that is closest to the client. This can detect by local Wi-Fi, or using some other technique. In this way, a default is set which is likely to be the default that is the proper receiver to receive the information.

The above has described embodiments wherein a stream receiver which was last used for a specified operation is stored as the selected stream receiver. In addition, however, a user can set this manually, or override the previously set information to set a different stream receiver as the default.

In one embodiment, the user is automatically prompted to see if they want to change the default stream receiver when a new stream receiver or a different set of stream receivers are present than those which were previously present when the default stream receiver was used.

The present application is described use with only a few different kinds of devices, and descriptions of these devices are provided herein. However, these descriptions are not intended to limit the present claims.

In the context of this application, a client device is a computing device that may be location fixed such as a desktop computer or may be a mobile device such as a laptop computer, tablet computer, smart cell phone, PDA, or other such mobile device.

A streaming content provider is a site residing on the internet or on an intranet where streaming multimedia content files reside. The site will begin streaming a requested file and can respond to a number of different stream related requests such as play, stop, reverse. Alternatively, the provider can simply stream the information, and the client can respond to these stream related requests. Netflix is one such client, but there are many others including HULU™ and others.

A Content Casting Application/Stream Casting Application is a software application executing on a client device. The content casting application is specific to a streaming content provider. The content casting application operates, once a content stream is chosen, send the URL for the content stream to a stream receiver. In some instances, application software code along with the content stream URL will be cast to the chosen stream receiver. The content casting application may also have the ability to cast the same stream to multiple stream receivers.

A stream receiver is a software application that may reside on a device connected to a display device such as a television. The stream receiver software may also reside in a display device such as a television or computer monitor.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system that operates for obtaining and casting a stream of information from a remote content provider, to one of a plurality of remote receivers, comprising:

a computer, running a casting application, that connects to a content provider over the internet, responsive to a request from a user that includes an identification of content but does not include an identification of a specific stream receiver, and the computer provides information about content from said content provider which can be selected for streaming, and receives a selection from the user of selected content to be streamed;

wherein said computer operates said casting application, said computer determining a specific user who has made the request, said computer accessing a profile of the specific user, and determining, from the profile, an identification of a specific stream receiver which has been previously used by the specific user from a different computer, different than the computer operating the casting application, wherein a stream receiver which was last used for playing the content from the different computer by the specific user from the different computer is automatically used as a selected stream receiver to receive the content and said computer operates to send the selected content to the selected stream receiver which has been previously stored from the different computer.

2. The system as in claim 1, where said content provider is selected from one of a plurality of different content providers available over the internet, and the user selects one of said content providers to obtain information about said content selection, and selecting said one of said content providers causes a call to a URL associated with said one of said content providers.

3. The system as in claim 2, wherein the specified operation is based on which of said different content providers is selected, and where the stream receiver used for a specific content provider the last time the content provider was used is automatically used as the specific stream receiver the next time the content provider is used without receiving a selection of the specific stream receiver.

4. The system as in claim 1, wherein the stream receiver which was last used is identified by a user login, and the last stream receiver used when a specific user is logged in is automatically used without user selection the next time that same user is logged in.

5. The system as in claim 1, wherein there is information about an identifying number of a single stream receiver in a global list.

6. The system as in claim 1, wherein the system checks the selected stream receiver to see if the stream receiver is busy, and sends the information to the selected stream receiver only when the selected stream receiver is not busy.

7. The system as in claim 6, wherein there are plural stream receivers in an ordered list, and the system automatically sends the stream to the next stream receiver in the order list when the selected stream receiver is busy.

8. A method of obtaining and casting a stream of information from a remote content provider, to one of a plurality of remote receivers, comprising:

running a casting application on a computer, said casting application connecting to a content provider over the internet, responsive to a request from a user, and providing information about content from said content provider which can be selected for streaming;

receiving a selection from the user of selected content to be streamed;

determining in the computer, a specific user who has made the request, accessing a profile of the specific user, and determining, from the profile, information indicative of an identification of a specific stream receiver which has been previously stored used by the specific user from a different computer, different than the computer operating the casting application wherein said obtaining comprises storing information about a stream receiver which was last used for playing the content by the specific user from the different computer is used as the selected stream receiver and is automatically used as the selected stream receiver; and selecting said selected stream receiver and sending the selected content to the selected stream receiver.

9. The method as in claim 8, further comprising selecting one of multiple content providers available over the internet, to obtain information about said content selection, said selecting said one of said content providers causing a call to a URL associated with said one of said content providers.

10. The method as in claim 9, wherein the specified operation is based on which of said multiple content providers is selected, and where the stream receiver used for a specific content provider the last time the content provider was used is automatically used as the selected stream receiver the next time the content provider is used.

11. The method as in claim 8, wherein the specific operation is a user login, and the last stream receiver used when a specific user is logged in is used the next time that same user is logged in.

12. The method as in claim 8, wherein there is information about an identifying number of a single stream receiver in a global list.

13. The method as in claim 8, wherein the method checks the selected stream receiver to see if the stream receiver is busy, and sends the information to the selected stream receiver only when the selected stream receiver is not busy.

14. The method as in claim 13, wherein there are plural stream receivers in an ordered list, and the method automatically sends the stream to the next stream receiver in the ordered list when the selected stream receiver is busy.

* * * * *